June 16, 1964

P. A. JONES 3,137,763

JUNCTION BOX WITH WEATHER-PROOF FIXTURE MOUNTING ADAPTER

Filed July 24, 1961

INVENTOR.
PRESTON A. JONES
BY
Gardner & Zimmerman
ATTORNEYS

United States Patent Office 3,137,763
Patented June 16, 1964

3,137,763
JUNCTION BOX WITH WEATHER-PROOF
FIXTURE MOUNTING ADAPTER
Preston A. Jones, San Rafael, Calif. (2229 4th St., Berkeley, Calif.), assignor of one-half to Wallace D. Runswick, Berkeley, Calif.
Filed July 24, 1961, Ser. No. 126,002
1 Claim. (Cl. 174—61)

This invention relates to mounting means for electrical fixtures and is particularly directed to an adapter for facilitating weatherproof sealed attachment of an electrical fixture to an outdoor junction box.

In the wiring of various electrical fixtures, such as lamps and the like, to a source of commercial power, junction boxes are commonly employed as a convenient means for enabling the fixture lead-in wires to be protectively joined to the commercial power wiring. Commonly, the fixture is mechanically secured as by means of a mounting plate to the open end of the box while the fixture lead-in wires are led into the box for electrical connection to other wires or cables terminated therein, the electrical connections being thereby enclosed within the box. Where fixtures are connected out-of-doors in this fashion, however, the interior of the junction box is not protected against the weather and moisture may readily accumulate within the box and create hazardous shorts in the electrical connections enclosed therein.

It is therefore an object of the present invention to provide means for facilitating attachment of an electrical fixture to a junction box with a weatherproof sealing of the box interior.

Another object of the invention is the provision of an adapter for use with a conventional junction to facilitate a weatherproof sealing thereof in the mounting of outside electrical fixtures.

It is still another object of the invention to provide weatherproof adapter means of the class described which permits a substantially flush mounting of a fixture with an exterior wall even though the junction box protrudes from the wall.

It is a further object of the invention to provide means for securing an electrical fixture to an exterior wall with weatherproof protection of the electrical connection thereof.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Figure 1:
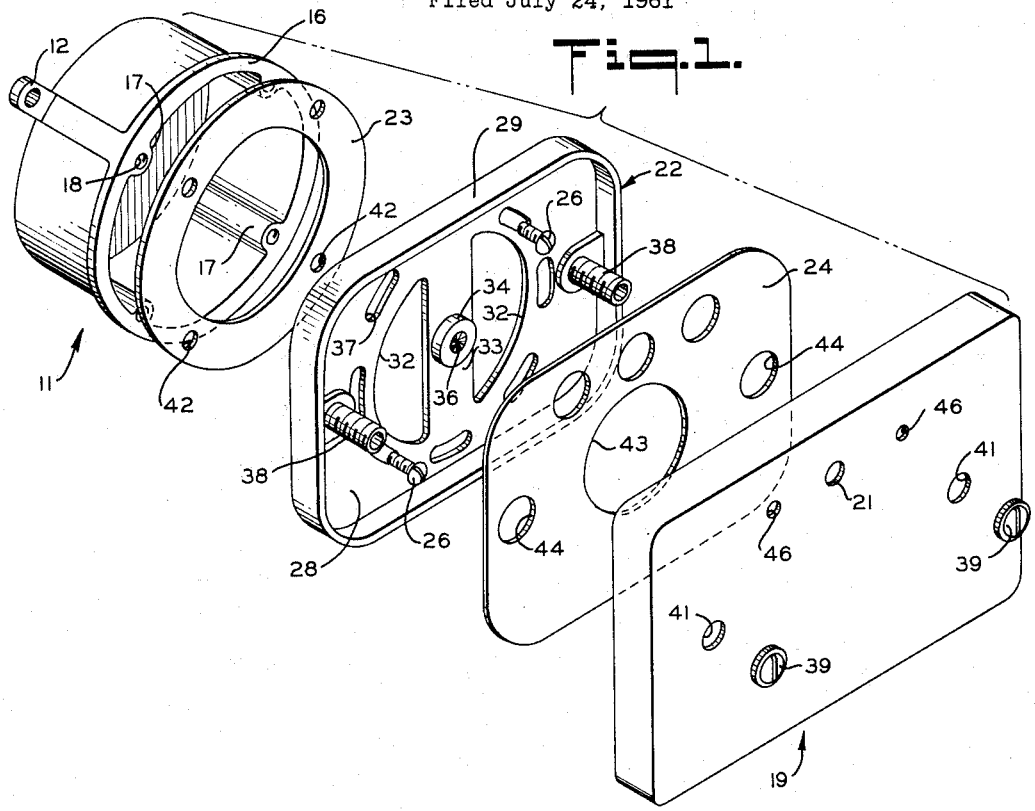
FIGURE 1 is an exploded perspective view of fixture mounting means including weatherproof adapter means in accordance with the present invention to effect a weatherproof sealing of the junction box to which the fixture is attached.

Referring now to the drawing, 11 designates a conventional junction box of cylindrical cupped configuration having radially projecting flanges 12 to facilitate attachment of the box in a hole 13 in a wall 14, which for purposes of illustration of the invention is an exterior wall. In addition, the box is provided with an annular flange 16 circumscribing its open end and circumferentially spaced interiorly projecting ribs 17 extending longitudinally inward from the flange 16 along the interior wall of the box. Each of these ribs is provided with a tapped bore 18 extending longitudinally thereinto from the flanged open end face of the box to receive threaded fasteners employed in the attachment of a fixture thereto.

Figure 2:
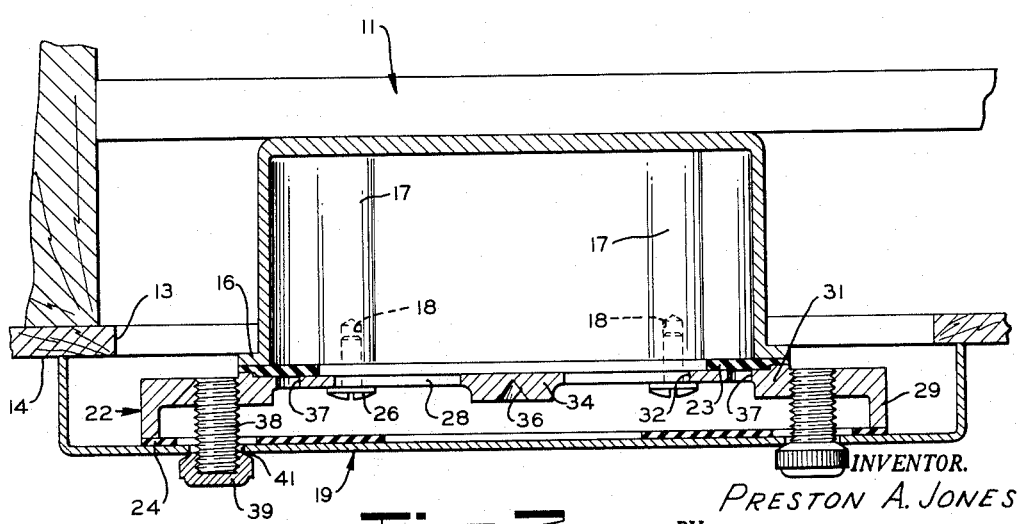
FIGURE 2 is a cross sectional view along a central horizontal plane through the mounting means as employed in the substantially flush mounting of a fixture on a well where the junction box protrudes therefrom.

In the conventional mounting of a fixture, a mounting plate, such as the rectangular cupped plate 19 would be directly secured to the box 11 by means of fasteners extending through the plate into threaded engagement with the tapped bores 18. The fixture would then be attached to the plate and its lead-in wires extended through an aperture 21 in the face of the plate into the open end of the junction box for electrical connection interiorly thereof to other wires or cable. However, in the case of outdoor fixture installations, the open end of the junction box necessarily faces exteriorly or even projects exteriorly through a wall as depicted in FIGURE 2. Hence the abutting juncture of the mounting plate 19 and open end of the box is exposed to the outside weather and moisture may readily penetrate the juncture and enter the box.

To overcome the foregoing difficulty, the present invention provides adapter means which enables a conventional junction box and fixture mounting plate to be utilized for outdoor fixture installations with a weatherproof sealing of the box interior. More specifically, the adapter means includes an adapter member 22 for interposition between the box and plate. The member 22 presents seating surfaces at its opposite end faces to gaskets 23, 24 which are respectively adapted to bear against the junction box flange 16 and interior end face of the mounting plate. Thus when the adapter member 22 is secured to the junction box with the gasket 23 therebetween, as by means of screws 26, and the mounting plate 19 is in turn secured to the adapter member with the gasket 24 therebetween the gaskets completely weather seal the box interior from the outside environment.

Considering now the adapter member 22 in greater detail as to its preferred construction, it is to be noted that the member is of generally rectangular cupped configuration, including a flat base 28 and marginal wall structure 29 projecting therefrom. The member is of somewhat greater length and width than the diameter of the junction box 11 such that the base will entirely cover the junction box flanged open end face and present an adequate area to encompass a seating surface for the gasket 23 for disposition therebetween. The length and width of the adapter member are, however, somewhat less than those of the mounting plate such that the wall structure 29 will freely fit within the marginal wall structure of the mounting plate. The face or rim of the adapter member wall structure will then be engageable with the interior end face of the mounting plate and present a knife edge seating surface to the gasket 24 for disposition therebetween.

In order to provide a knife edge seating surface for the gasket 23, the exterior surface of the adapter member base 28 is formed with an annular rib 31 concentrically about its center. The outer diameter of the rib is equal that of the junction box flange 16 such that the rib will bear against the flange face. Within the circumferential compass of the rib, the base 28 is provided with openings 32 to afford access to the junction box interior to wires extending from a fixture secured to the mounting plate. The openings may be of any desired number and configuration. However, in the preferred construction a pair of the openings 32 are provided having opposed substantially semicircular configurations separated by a diametric bridging strip 33. A boss 34 is provided centrally of the strip containing a pilot bore 36 for purposes subsequently described.

To facilitate attachment of the adapter member to the junction box, a plurality of arcuate slot apertures 37 are provided in the base 28 to facilitate passage of the screws 26 therethrough into threaded engagement with the tapped bores 18 of the junction box. These slot apertures are concentrically disposed with reference to the center of the adapter member base 28 and are centered upon a circumference equal that of the junction box bores 18. The slot apertures are within the compass of the rib 31. The slot apertures permit the adapter member to be rotated within the limits of the slot lengths when the screws are loosely engaging the junction box bores 18. Some degree of adjustment in the orientation of the adapter relative to the box prior to tightening the screws is thus afforded.

Attachment of the mounting plate 19 to the adapter member is facilitated by means of a pair of threaded studs 38 projecting from the interior face of the base 28 adjacent the centers of the opposed lateral sides of the marginal wall structure 29. Such studs 38 are threadably engageable by slotted cap nuts 39 arranged for abutment with the exterior end face of the mounting plate subsequent to traversal of a pair of apertures 41 therein registerable with the studs.

With regard to the gaskets 23, 24 it will be noted that same are preferably fabricated from rubber or equivalent compressible material employed for moisture sealing purposes. The gasket 23 is preferably annular with an outside diameter equal that of the junction box flange 16. In addition, the gasket is provided with apertures 42 registerable with the tapped bores 18 of the junction box to facilitate traversal by the screws 26. The gasket 24, on the other hand, is generally rectangular and exteriorly conformed to the periphery of the rim of the marginal wall structrue 29 of the adapter member. Gasket 24 includes a central opening 43 to facilitate passage therethrough of fixture lead wires and a pair of apertures 44 registerable with the mounting plate apertures 41 for traversal by the studs 38.

In the outdoor installation of a fixture with the junction box weatherproofing adapter means in accordance with the present invention, the junction box 11 is mounted in the wall opening 13 in the usual manner, the open end of the box in the present instance projecting exteriorly beyond wall 14 as depicted in FIGURE 2. The gasket 23 is placed against the junction box flange 16 with the gasket apertures 42 in registry with junction box tapped bores 18. The adapter member 22 is placed with its rib 31 bearing against the gasket in opposition to the flange 16 and with an appropriate pair of the slotted apertures 37 aligned with the apertures 42 and tapped bores 18. The screws 26 are inserted through the aligned adapter member apertures and gasket apertures into threadable engagement with the bores 18. The member 22 is then suitably oriented within the limits of apertures 37 and the screws tightened to draw the adapter member rib 31 closely against the gasket. The gasket is thus compressed between the rib and junction box flange 16 to provide an extremely effective weatherproof seal therebetween.

The threaded studs 38 are now inserted through the apertures 44 of gasket 24 and such gasket is placed flush against the rim of the marginal wall structure 29 of the adapter member 22. The mounting plate 19 is placed with its interior face in contact with gasket 24, the studs traversing the apertures 41. The cap nuts 39 are screwed on the projecting ends of the studs and tightened against the mounting plate thereby drawing same tightly against gasket 24. The gasket is thus compressed between the mounting plate and knife edge defined by the rim of the adapter member marginal wall structure to provide a highly effective weatherproof seal therebetween. The marginal wall rim of the mounting plate abuts the exterior wall 14.

A fixture (not shown) may now be readily attached to the mounting plate as by means of screws engaging tapped bores 46 on opposite sides of the wire feed through aperture 21. Alternatively, the pilot bore 36 of the adapter member may be tapped and the fixture attached to the mounting plate by a threaded fastener extending through a registering aperture (not shown), drilled through the plate, into threadable engagement with the tapped pilot bore. The fixture lead-in wires are passed, for example, through plate aperture 21, and through gasket opening 43, adapter member openings 32, and central opening of annular gasket 23 into the interior of the junction box. It will thus be appreciated that the only unsealed opening to the junction box interior is through the wire feed through aperture 21 and such aperture is readily sealed by the employment of a rubber grommet or the like in the passage of the lead wires therethrough.

What is claimed is:

Means for the outdoor attachment of an electrical fixture comprising a junction box open at one end and adapted for securance to a wall with said open end facing outwardly from one side of the wall, an adapter member disposed in generally covering relation with said open box end and having marginal walls projecting away from said box, said member having a gasket seating ridge on its face disposed in adjacent opposition to the confronting end of said junction box, a gasket interposed between said seating ridge and box, means securing said adapter member to said box and compressing said gasket therebetween, a fixture mounting plate disposed in generally overlying relation to the remaining face of said member, said plate having its peripheral portion extending outwardly of said adapter and box in overhanging relation thereto, marginal side walls provided on said plate adjacent said peripheral portion thereof outwardly of said marginal walls of said adapter member and projecting towards said box for abutment against said wall, a second gasket interposed between the inner face of said mounting plate and the confronting ends of said side walls of said member, and means securing said mounting plate to said adapter member and compressing said second gasket therebetween.

References Cited in the file of this patent
UNITED STATES PATENTS

| 1,330,620 | Bonnell | Feb. 10, 1920 |
| 2,420,103 | Smith | May 6, 1947 |

FOREIGN PATENTS

| 612,935 | Canada | Jan. 17, 1961 |
| 1,132,276 | France | Oct. 29, 1956 |